INVENTOR.
Günther Wilhelm Emele

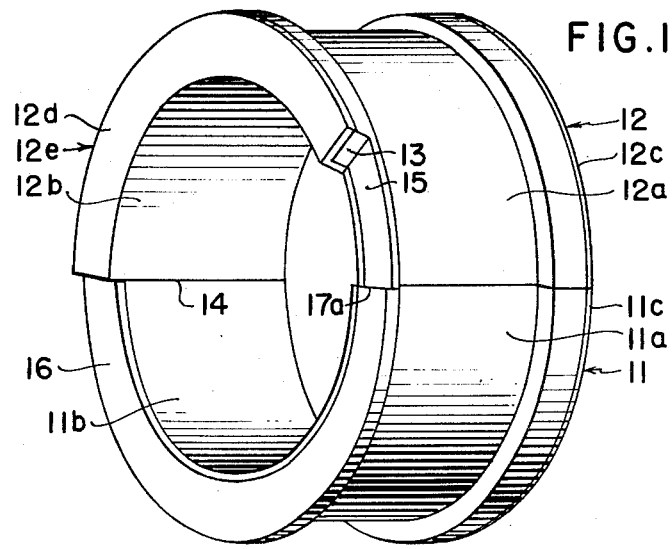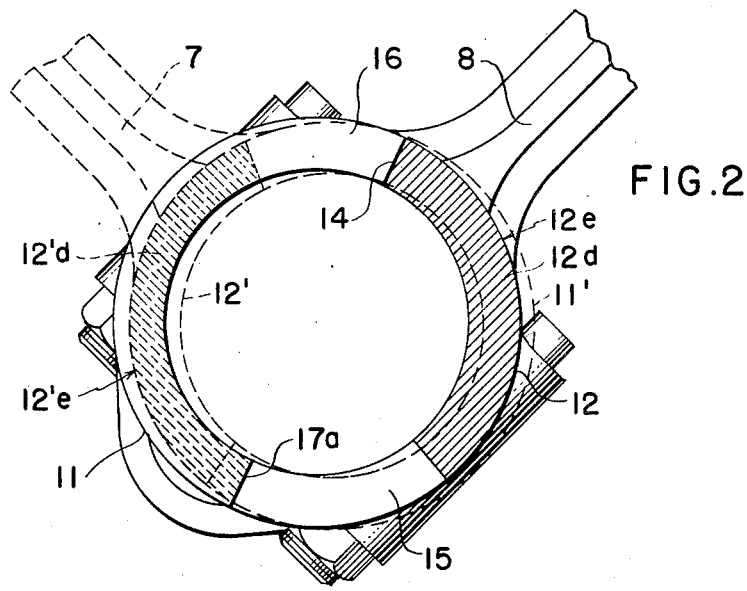

United States Patent Office 2,780,502
Patented Feb. 5, 1957

2,780,502

CONNECTING-ROD BEARING

Günther Wilhelm Emele, Munich-Obermenzing, Germany, assignor to Krauss-Maffei Aktiengesellschaft, Munich-Allach, Germany, a corporation of Germany Application January 25, 1955, Serial No. 484,050

2 Claims. (Cl. 308—23)

My invention relates to connection-rod bearings for internal combustion engines in V-, W- or opposed-piston arranged banks of cylinders requiring two or more connecting rods to act upon the same throw or crank pin of the crankshaft. More particularly, the invention involves connecting-rod bearings whose shells have cast-on lateral projections serving, for instance in conjunction with splash lubrication, to reduce the sliding friction at the axial bearing faces and to improve the running and sliding properties of the bearings. The invention is a continuation-in-part of my application entitled Connecting-Rod Bearings for Internal Combustion Engines with a Plurality of Cylinder Rows, Serial No. 276,491, filed March 14, 1952, now abandoned, and assigned to the assignee of this application.

In engines of the type described, the axes of the cylinders in respectively different banks whose respective connecting rods operate upon the same crank pin are displaced relative to each other in a direction parallel to the crankshaft axis. While no appreciable forces are expected to act laterally upon the connecting-rod bearings, considerable wear occurs at the mutually contacting axial surfaces of the adjacent bearings.

Referring to such plural-bank engines with adjacent connecting-rod bearings on a common crank pin, it is an object of my invention to reliably improve the running properties of the connecting-rod bearings by securing satisfactory lubrication between the adjacent bearings of each crank pin while giving the individual bearing shell members a simple design that permits corresponding parts of the connecting-rod bearings to be identical and interchangeable.

To this end, and in accordance with my invention, the two mutually engaging contact surfaces of adjacent bearings overlap each other in a claw-like engagement; and this engagement is obtained by providing one of the half-shell members of each bearing with a lateral cast-on projection of annular shape covered by bearing metal such as Babbitt metal, while the other half-shell member of the same bearing lacks such a projection and is bare over its entire angular extent. The bearing-metal covering of the annular projection is cast on as an integral portion of the usual cylindrical lining of bearing metal. To make each half shell identical with a half shell of the adjacent bearing, the annular shoulder portion is disposed symmetrically to the bisection line of the angle between the respective cylinders, i. e. to the center plane between the respective cylinder banks.

According to another feature of the invention, only one half-shell member of each bearing has a cast-on lateral projection, and this projection extends from one peripheral end of that half-shell member over only a portion of the half shell so that the bearing has a set-back annular bearing face extending over an angle larger than the maximum angular movement of the adjacent connecting rods relative to each other. This set-back face is not covered with a layer of bearing metal and it lies in cooperative frictional engagement with the bearing-metal layer of the projection of the adjacent bearing.

Such a connecting-rod bearing assembly has the advantage that the bearing shell members having the cast-on projections may be machined together, and that the remaining shell members of the respective bearings may also be machined together, thus considerably simplifying their manufacture. Due to the symmetrical position of the integral claw-like annular projections, the corresponding half-shell members of the respective bearings have identical shapes and dimensions, and are, therefore, interchangeable. Above all, however, the claw-like sliding engagement of the bearing shell members having an annular projection lined with bearing metal against the bare steel or bronze body of the adjacent bearing shell member greatly reduces the interfacial sliding friction of the adjacent bearings so that pitting and other wearing tendencies at the axial bearing faces are safely eliminated.

The foregoing and more specific features of the invention will be apparent from the embodiments of the invention exemplified by the drawings, in which:

Fig. 1 shows a perspective view of one of the split or half-shell connecting-rod bearings pertaining to a bearing assembly according to the invention;

Fig. 2 is a schematic and explanatory diagram showing essentially an axial view of an assembly of two adjacent bearings according to Fig. 1;

Before dealing with the invention proper, some general characteristics of engines of the types herein referred to and essential to an understanding of the invention will first be discussed with reference to Figs. 3 to 5.

Figure 3:
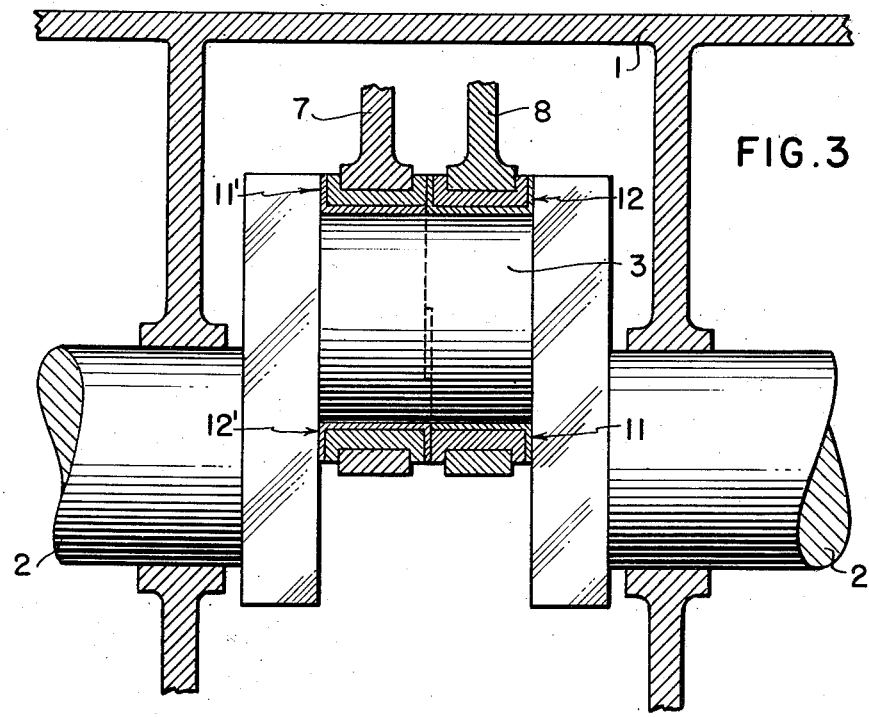
Fig. 3 shows diagrammatically a crankshaft with two adjacent connecting rods having aa bearing assembly according to the invention.

In Fig. 3, the crankcase of a V-type engine is denoted by 1. Journalled in the crankcase is the crankshaft 2 with a crank pin 3. In Figs. 4 and 5 the axis of the crankshaft is indicated at 5, and the circle of rotation of the crank pin is shown at 6. Seated on the crank pin 3 (Fig. 3) are the bearings of two adjacent connecting rods 7 and 8 pertaining to the respective pistons of two cylinders in the two V-arranged banks. The axes of these two cylinders are indicated in Figs. 4 and 5 at 9 and 10 respectively. The connecting rod 8, as shown in Fig. 3, has a split-shell bearing with two half-shell members 11 and 12 which are firmly seated and clamped in the connecting-rod end and are revolvable relative to crank pin 3. The bearing of rod 7 is similarly composed of half-shell members 11' and 12'. During each cycle of rotation the two connecting rods and the pertaining bearings move angularly relative to each other. Any two points on the respective contacing axial faces of the two bearings which coincide when the relative angular positions of their connecting rods are at a minimum will be separated from each other a given angular amount when the relative angular connecting-rod positions are at a maximum, and this angular amount is hereinafter briefly referred to as "angular movement" of the bearings or connecting rods.

In the following, reference is also made to the "shoulder angle." This term is understood to mean the peripheral angular extent of the annular projection or shoulder portion with which each bearing is provided. That is, the "shoulder angle" is the angle determined by the crank pin radii passing through the peripheral ends of the annular shoulder portion of each bearing. Also used hereinafter is the term "free angle," denoting the maximum angle on the axial face of each bearing which, during each full crank rotation, is temporarily free of the annular shoulder portion of the adjacent bearing. This free angle is somewhat larger than the relative angular movement of the bearings to prevent obstructing the movement of the connecting rods by the claw-like shoulder projections abutting against each other.

The design of the connecting-rod bearings according to the invention will now be described in detail with reference to the embodiment shown in Figs. 1 and 2.

The connecting-rod half-shell bearing member 12 illustrated in Fig. 1 comprises a half-shell backing 12a, preferably of steel, formed with an integral projection 13 at the axial end thereof that is to face the adjacent bearing on the same crank pin. The complementary half-shell bearing member 11 has a half-shell backing 11a, also preferably of steel, and is plain, i. e., it does not have an axial projection. The complementary bearing-shell members 11 and 12 are provided with the usual cast-on internal semi-cylindrical linings 11b and 12b, respectively, of bearing or Babbitt metal. Each of these linings extends outwardly over the outer end surfaces of the shells to provide respective rear bearing metal faces 11c and 12c. The half shell backing 12a, moreover, has upon its integral projection 13 a layer of cast-on bearing metal 12d which, together with the projection 13, provides the annular shoulder portion of the bearing. This shoulder portion is indicated generally by the reference character 12e.

The shoulder portion 12e of shell member 12 extends over a shoulder angle determined by the required free angle which, in turn, is dependent upon the piston (or connecting-rod) stroke and the radius of the crank pin. Preferably, as is shown, the shoulder portion 12e commences at one of the split gaps 14 of the bearing. By means of such construction, the half shell backing 12a has only one recessed face 15 to be machined at its shoulder side. The axially adjacent bearing has its shell members (11' and 12' in Figs. 2, 3) designed to be the same as the respective shell members 11 and 12. When the two bearings are assembled on the crank pin, the bearing-metal surfaced shoulder portion 12e of half shell backing 12a slides on the bare axial face of the steel body of shell member 11', and the bearing-metal surfaced shoulder portion of shell 12' slides on the steel axial face 16 of shell member 11 so that both bearings are in a claw-like engagement with each other. The receding face 15 of shell member 12 is machined to be somewhat more recessed than the adjacent face 16 of the plain shell member 11 to prevent, in the event of slight inaccuracies of machining, the shoulder portion of the adjacent bearing from sliding only on the relatively small recessed face portion 15 of shell member 12 or from being obstructed at the split gap 17a. The difference between the planes of faces 15 and 16, of course, need only be slight. The recessing is exaggerated in Fig. 1 for the purpose of better illustration.

The conditions of movement and the angular relations of the bearings will be more fully understood from the axial view of the bearing for connecting rod 8 shown in Fig. 2. Superimposed upon this view is a showing, in broken lines, of the connecting rod 7 with the pertaining bearing, which actually lies in front of the plane of illustration. The view of the bearing shells 11 and 12 in Fig. 2 is similar to that in Fig. 1. The front face of the layer of cast-on bearing metal 12d of shoulder portion 12e is cross-hatched in Fig. 2 to distinguish it from the recessed face portion 15 and from the plain face 16 of shell member 11. Similarly, the front face of the layer of cast-on bearing metal 12'd of the shoulder portion 12'e on the bearing of rod 7 is distinguished by broken-line cross-hatching. Also, for better distinction, the superimposed bearing is shown somewhat off center, although in reality, of course, both bearings are coaxial. The angular lengths of the shoulder portions 12e and 12'e are equal and such that the remaining peripheral spacing between the shoulders is equal to the desired free angle. This free angle corresponds to the angular length of the portion of face 16 that, in Fig. 2, lies between the respective upper ends of shoulder portions 12e and 12'e; and this angle, of course, is also equal to the peripheral angular spacing between the lower ends of the shoulder portions 12e and 12'e respectively. The shoulder angles as well as the free angles are symmetrical to the center plane between the V-arranged cylinders, this plane corresponding in Fig. 2 to the vertical center line (not shown).

Figure 4:
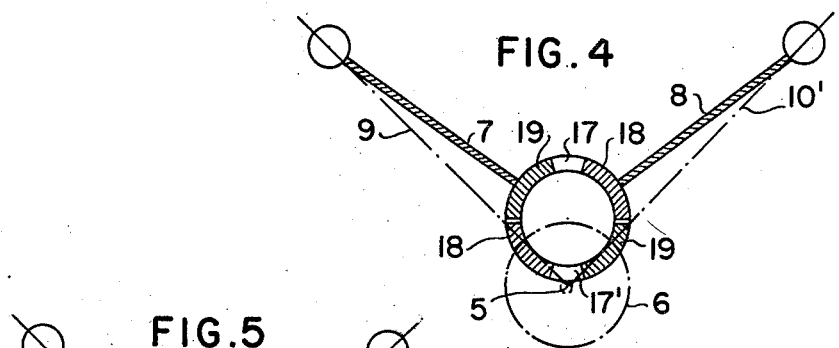
Figs. 4 and 5 illustrate diagrammatically and in two respective operating positions a modfied bearing assembly also in accordance with the invention.
Figure 5:
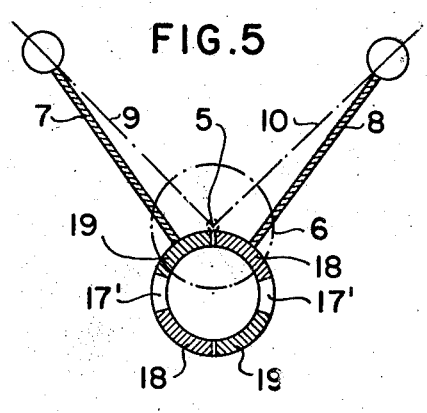

In the modified embodiment shown in Figs. 4 and 5, each of the two half-shell members of each connecting-rod bearing has a shoulder portion. The two shoulder portions 18 of the bearing for connecting rod 8 are diametrically opposed. The shoulder portions 19 of the bearing for connecting rod 7 are also opposed. The free angles correspond to the angular length of the segments denoted by 17—17'. Since these free angles must have the same magnitude as in the embodiment of Figs. 1 and 2, and since the number of cast-on shoulder projections is doubled, each shoulder portion can extend over only half the shoulder angle compared with the bearing assembly of Figs. 1 and 2. The shoulder angles are again preferably symmetrical to the center line of the angular movement of the connecting rods, i. e. to the center plane between the V-arranged cylinder axes, so that all bearing shells are interchangeable. In this case, however, each individual shell has two axial face portions to be machined, one at each side of the shoulder portion.

I claim:

1. A connecting-rod bearing assembly for internal combustion engines having adjacent connecting rods for engagement with a common crank pin, comprising a plurality of bearings, each bearing comprising two complementary shell members, said bearings being disposed coaxially adjacent to each other and having respective lateral annular faces, at least the major parts of which slide on each other, said annular faces having respective arcuate shoulder portions which overlap each other in claw-like fashion, only one shell member of each of said bearings having said arcuate shoulder, said shoulders each having bearing metal covering, each of the covered shoulders axially protruding toward the other bearing and extending over a peripheral angle which is less than 180° and is less than the arcuate extent of the annular face of the shell member, to permit angular displacement of the rods with respect to each other, said respective shouldered shell members having the same form, and said other two shell members having the same form, the remaining part of the lateral annular face of each shell member which is provided with said shoulder being recessed a distance required to provide clearance between it and the adjacent shoulder of the other bearing.

2. A connecting-rod bearing assembly for internal combustion engines having adjacent connecting rods for engagement with a common crank pin, comprising a plurality of bearings, each bearing comprising two complementary shell members, said bearings being disposed coaxially adjacent to each other and having respective lateral annular faces, at least the major part of each of which slides on each other, said annular faces having respective arcuate shoulder portions which overlap each other in claw-like fashion, only one shell member of each of said bearings having said arcuate shoulder, said shoulders each having a bearing metal covering, each of the covered shoulders axially protruding toward the other bearing and extending over a peripheral angle which is less than 180° and is less than the arcuate extent of the annular face of the shell member, to permit angular displacement of the rods with respect to each other, said respective shouldered shell members having the same form and said other two shell members having the same form, the remaining part of the lateral annular face of each shell member, which is provided with said shoulder, being recessed a distance required to provide clearance between it and the adjacent shoulder of the other bearing, each of the shoulders commencing at an axially extending edge of the shell member on which it is formed and extending toward but not to another axially extending edge of the said shell member, the edges being the line of separation of the two complementary shell members, whereby the sliding shoulders are prevented from contacting the said remaining parts and are unhindered by the line of separation.

References Cited in the file of this patent

FOREIGN PATENTS

| | | | |
|---|---|---|---|
| 414,198 | Great Britain | Aug. 2, | 1934 |
| 414,795 | Great Britain | Aug. 16, | 1934 |
| 882,297 | France | May 28, | 1943 |
| 701,465 | Germany | Jan. 16, | 1941 |